2,792,399
ANILIDES OF HETEROCYCLIC COMPOUNDS

Bo Thuresson af Ekenstam, Bofors, and Börje Per Harald Egnér, Karlskoga, Sweden, assignors to Aktiebolaget Bofors, Bofors, Sweden, a corporation of Sweden No Drawing. Application May 24, 1955,
Serial No. 510,862

Claims priority, application Sweden May 29, 1954

8 Claims. (Cl. 260—294)

This invention relates to N-alkyl piperidine monocarboxylic and N-alkyl pyrrolidine-monocarboxylic acid amides according to the general formulas:

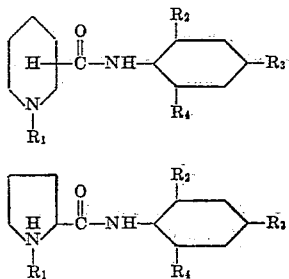

In these formulas $R_1$ denotes an alkyl group, $R_2$ denotes a hydrogen atom, a lower alkyl group or a chlorine atom, $R_3$ denotes a hydrogen atom, a hydroxy group, a lower alkyl group or an alkoxy group, and $R_4$ a hydrogen atom, a chlorine atom, a lower alkyl group or an alkoxy group. $R_2$, $R_3$ and $R_4$ can also be hydrogen at the same time.

These novel amides have proved to be excellent local anaesthetics with a low toxicity in relation to their activity.

The compounds of this invention are prepared by allowing an anhydrous N-alkyl piperidine monocarboxylic or N-alkyl pyrrolidine α-monocarboxylic acid, or the anhydride, or the ester or the chloride of these acids to react with an aromatic amine or an isocyanate corresponding to such amine.

For therapeutic use it is most convenient to employ salts of organic or inorganic acids of the amides; the hydrochlorides have been found as most suitable.

The invention is illustrated by the following examples:

Example 1

212 parts of N-ethyl nipecotic acid chloride hydrochloride are suspended in 1700 parts of acetone, and allowed to react with 121 parts of 2,6-dimethyl aniline under cooling and vigorous stirring for a period of about half an hour. Care is taken to keep the reaction mass at a temperature not exceeding 35° C. When the reaction has subsided and after holding the mass for one hour at 30°–35° C., the acetone is driven off at normal pressure. The last traces of acetone are removed by means of vacuum.

The residue is dissolved in 750 parts of water, the pH value of the solution is adjusted to 5.5, and unreacted xylidine is extracted with a suitable extraction agent, e. g. ether, benzene or toluene. The aqueous solution is freed from residues of the extraction agent by distillation whereupon it is treated with 5–10 parts of activated carbon. After filtering, the free base, N-ethyl nipecotic acid-2,6-dimethyl anilide, is precipitated. The base precipitating in crystalline form is sucked off and washed with water. Generally, the product is pure enough to be used for the preparation of salts after vacuum drying.

Example 2

171 parts of anhydrous N-n-butyl pyrrolidine α-carboxylic acid are heated together with 335 parts of 2-chloro-6-methyl phenyl isocyanate under good stirring at the temperature of 90–110° C. The reaction is characterized by a heavy evolution of carbon dioxide, the cessation of which shows that the reaction is completed. The excess of isocyanate is carefully distilled off under vacuum, and the whole process is carried out under good ventilation. To the residue of the reaction there is added an equivalent quantity of 10–15 percent hydrochloric acid. The solution is boiled for 15 minutes, then cooled, and insoluble by-products formed in the reaction are removed by filtering. The filtrate contains the hydrochloride of N-n-butyl pyrrolidine α-monocarboxylic acid 2-chloro-6-methyl anilide formed by the reaction. The reaction product is further treated in accordance with Example 1.

Example 3

157 parts of N-n-propyl pyrrolidine α-carboxylic acid are slowly heated with 121 parts of 2-ethyl aniline while the water formed in the reaction is driven over from 120° C. to 230° C., for a total reaction time of 6 hours. The reaction residue is acidified to a pH of 3–4 with 10–15 percent hydrochloric acid, and the treatment is continued in accordance with Example 1. The reaction product is N-n-propyl pyrrolidine α-carboxylic acid 2-ethyl anilide.

Example 4

268 parts of N-methyl nipecotic acid anhydride are heated successively with 165 parts of 2,6-dimethyl-4-ethoxyaniline to 140°–160° C. for a total reaction time of 2 hours. The reaction residue is acidified to a pH of 3–4 with 10–15 percent hydrochloric acid, and the treatment is continued in accordance with Example 1. From the mother liquor, after extracting the formed N-methyl nipecotic acid 2,6-dimethyl-4-ethoxy anilide, the major part of the N-methyl nipecotic acid also formed by the reaction is recovered as hydrochloride after evaporation to dryness, dissolution in alcohol, filtration and repeated evaporation.

Example 5

171 parts of N-methyl isonipecotic-acid ethyl ester are heated together with 93 parts of aniline at a temperature of 180–195° C., and the ethyl alcohol formed during the reaction is continuously driven off through a short column. The completion of the reaction is marked by the cessation of the ethyl alcohol distillation. The time of reaction is 8–10 hours. Further treatment is carried out in accordance with Example 1. The reaction product is N-methyl isonipecotic acid anilide.

Example 6

143 parts of absolutely anhydrous N-methyl pipecolic acid are heated with 300 parts of 2,6-dimethyl phenyl isocyanate under conditions given in Example 2. Treatment is carried out in accordance with Example 1. The reaction product is N-methyl pipecolic acid 2,6-dimethyl anilide.

Example 7

199 parts of anhydrous N-cyclopentyl pipecolic acid are heated with 300 parts of 2,6-dimethyl phenyl isocyanate under conditions given in Example 2. Treatment is carried out in accordance with Example 1. The reaction product is N-cyclopentyl pipecolic acid 2,6-dimethyl anilide.

Example 8

198 parts of N-methyl pipecolic acid chloride hydrochloride are reacted with 181 parts of 2,6-dimethyl-4-butoxy aniline under conditions given in Example 1. The reaction product is N-methyl pipecolic acid 2,6-dimethyl-4-butoxy anilide.

Example 9

212 parts of N-ethyl pipecolic acid chloride hydrochloride are reacted with 135 parts of 2,4,6-trimethylaniline under conditions given in Example 1. The reaction product is N-ethyl pipecolic acid 2,4,6-trimethyl anilide.

Example 10

258 parts of N-cyclohexyl nipecotic acid chloride hydrochloride are reacted with 137 parts of 2,6-dimethyl-4-hydroxy aniline under conditions given in Example 1. The reaction product is N-cyclohexyl nipecotic acid 2,6-dimethyl-4-hydroxy anilide.

Example 11

212 parts of N-ethyl nipecotic acid chloride hydrochloride are reacted with 165 parts of 2,4-dimethyl-6-ethoxy aniline under conditions given in Example 1. The reaction product is N-ethyl nipecotic acid 2,4-dimethyl-6-ethoxy anilide.

It will be understood that the foregoing description of the invention and the examples set forth are merely illustrative of the principles thereof. Accordingly the appended claims are to be construed as defining the invention within the full spirit and scope thereof.

We claim:

1. Amides of the group consisting of N-alkyl piperidine monocarboxylic amides and N-alkyl pyrrolidine α-monocarboxylic amides having the general formulas:

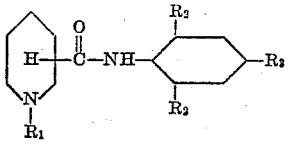

and

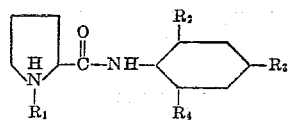

wherein $R_1$ represents an alkyl group, $R_2$ is a member of the group consisting a hydrogen atom, a lower alkyl radical and a chlorine atom, $R_3$ is a member of the group consisting of a hydrogen atom, a hydroxy radical, a lower alkyl radical and an alkoxy radical and $R_4$ is a member of the group consisting of a hydrogen atom, a chlorine atom, a lower alkyl radical and an alkoxy radical.

2. N-ethyl nipecotic acid 2,6-dimethyl anilide.
3. N-n-butyl pyrrolidine α-carboxylic acid 2-chloro-6-methyl anilide.
4. N-n-propyl pyrrodiline α-carboxylic acid 2-ethyl anilide.
5. N-methyl nipecotic acid 2,6-dimethyl-4-ethoxy anilide.
6. N-methyl isonipecotic acid anilide.
7. N-methyl pipecolic acid 2,6-dimethyl anilide.
8. Method of manufacturing compounds of the class defined in claim 1 which comprises reacting a member of the group consisting an N-alkyl piperidine monocarboxylic acid and an N-alkyl pyrrolidine α-monocarboxylic acid, the anhydrides, the esters and the acid chlorides of said acids, with a member of the group consisting of aniline and substituted anilines having substituents in positions 2, 4 and 6 as defined in claim 1, and phenyl isocyanates corresponding to said anilines.

References Cited in the file of this patent

FOREIGN PATENTS 539,178     Germany _____ Nov. 23, 1931